United States Patent [19]

Smeets

[11] Patent Number: 5,703,763
[45] Date of Patent: Dec. 30, 1997

[54] POWER SUPPLY APPARATUS WITH IMPROVED EFFICIENCY

[75] Inventor: Patrick E. G. Smeets, Eindhoven, Netherlands

[73] Assignee: U.S. Philips Corporation, New York, N.Y.

[21] Appl. No.: 705,550

[22] Filed: Aug. 29, 1996

[30] Foreign Application Priority Data

Sep. 1, 1995 [EP] European Pat. Off. ............ 95202364

[51] Int. Cl.$^6$ .................................................. H02M 3/335
[52] U.S. Cl. .................................................. 363/20; 363/21
[58] Field of Search .......................... 363/18, 20, 21, 363/50

[56] References Cited

U.S. PATENT DOCUMENTS

| | | | |
|---|---|---|---|
| 4,313,155 | 1/1982 | Bock et al. | 363/21 |
| 5,117,347 | 5/1992 | Rebello et al. | 363/56 |
| 5,383,106 | 1/1995 | Yoshida et al. | 363/18 |
| 5,513,088 | 4/1996 | Williamson | 363/20 |
| 5,535,112 | 7/1996 | Vazquez Lopez et al. | 363/20 |
| 5,621,623 | 4/1997 | Kuriyama et al. | 363/20 |
| 5,621,625 | 4/1997 | Bang | 363/21 |

FOREIGN PATENT DOCUMENTS

3634990A1  6/1987  Germany .............. H02M 3/28

*Primary Examiner*—Stuart N. Hecker
*Attorney, Agent, or Firm*—Edward Blocker

[57] ABSTRACT

A power supply apparatus including at least one coil and a controllable switching element and a peak-limiting circuit for limiting the maximum voltage across the switching element. The peak-limiting circuit includes a capacitor and a series connection of a first rectifier element and a resistor, as well as a second rectifier element which connects one end of the series connection to the positive input terminal of the apparatus. The energy dissipation in the resistor is dependent on the duty cycle of the switching element. The duty cycle in turn is dependent on the load of the power supply apparatus. Consequently, when the load of the power supply apparatus is small, the dissipation of the apparatus will be substantially lower.

1 Claim, 1 Drawing Sheet

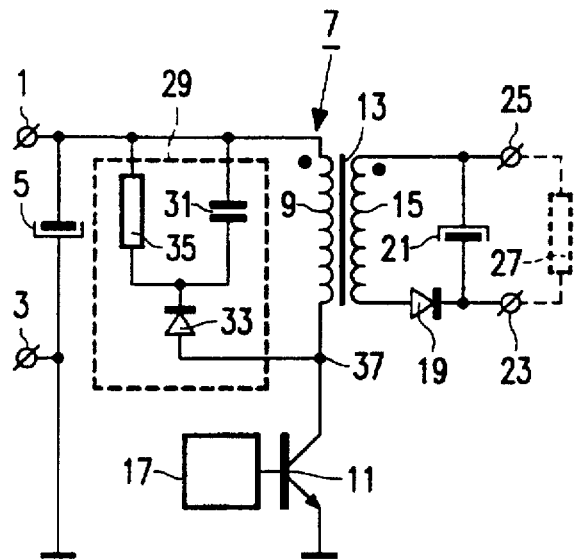
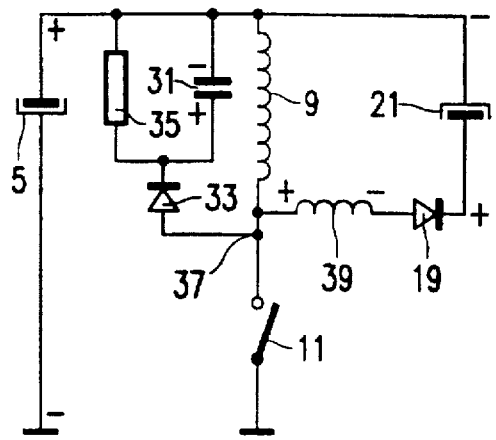
FIG. 1A
PRIOR ART
FIG. 1B
PRIOR ART
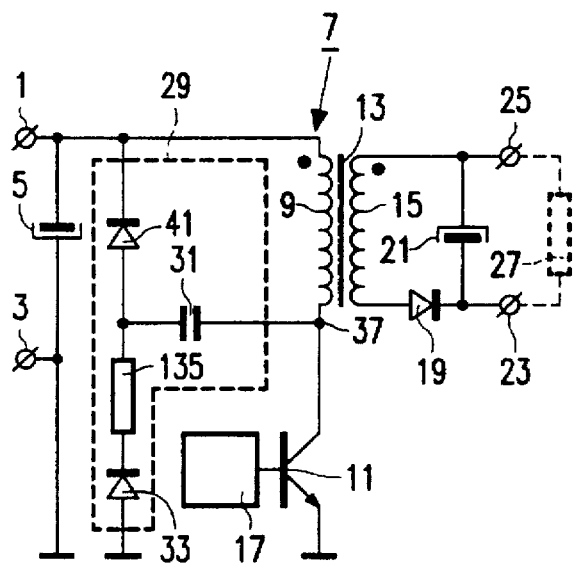
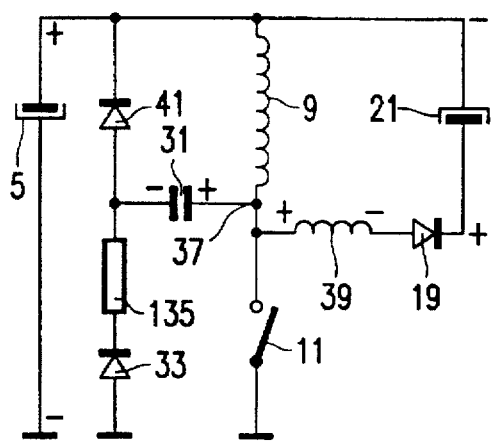
FIG. 2A
FIG. 2B

POWER SUPPLY APPARATUS WITH IMPROVED EFFICIENCY

BACKGROUND OF THE INVENTION

The invention relates to a power supply apparatus for converting an electric direct voltage, acting as an input voltage, into an output voltage, comprising positive and negative input terminals which are arranged to receive the input voltage, a first series connection which consists of at least one coil and a controllable switching element and interconnects the input terminals, and a peak-limiting circuit for limiting the maximum voltage across the switching element, said peak-limiting circuit comprising at least a capacitor and a second series connection which consists of a first rectifier element and a resistor and is connected to the positive input terminal as well as to the junction of the coil and the switching element.

A power supply apparatus of this kind is known from DE-A-36 34 990, notably from FIG. 1b. The peak-limiting circuit aims to limit the voltage which may arise across the switching element during the switching-off of said switching element. The switching element is generally a semiconductor switching element, for example a bipolar transistor or a MOSFET. Such elements can be readily damaged by a high voltage. The peak-limiting circuit limits the maximum voltage across the switching element in that the current flowing through the coil prior to switching off is diverted to the first capacitor immediately after switching off. In the first capacitor an electric charge is then built up, which charge is drained via the resistor so that the capacitor has regained its initial state again the next time that the switching element is switched off. The energy stored in the capacitor is then converted into heat in the resistor. The amount of energy thus dissipated may be comparatively large, so that the efficiency of the power supply apparatus is comparatively low. The cited document proposes to enhance the efficiency of the apparatus by means of an additional winding on the transformer whose coil constitutes the primary winding. However, this step has a substantial cost-increasing effect so that it is not very well suitable for power supply apparatus which must be manufactured at minimum cost, for example power supply apparatus for use in television receivers.

SUMMARY OF THE INVENTION

It is an object of the invention to improve a power supply apparatus of the kind set forth in such a manner that its efficiency is enhanced without its cost being substantially increased. To achieve this, the power supply apparatus in accordance with the invention is characterized in that the peak-limiting circuit also comprises a second rectifier element which connects an end of the second series connection to the positive input terminal, the forward directions of the rectifier elements in the part of the peak-limiting circuit formed by the first and the second rectifier elements and the resistor being the same, the other end of the second series connection being connected to the negative input terminal, and the capacitor being connected between the anode of the second rectifier element and the junction of the coil and the switching element. As a result of these steps, the energy dissipation in the resistor is dependent on the duty cycle with which the switching element is switched on and off. This duty cycle itself is dependent on the load of the power supply apparatus. As a result, in the case of a low load the apparatus in accordance with the invention will have a dissipation which is substantially lower than that of the known power supply apparatus. This is particularly important in the case of power supply apparatus which are permanently switched on, even if the apparatus they power is not in operation itself. This situation occurs, for example in electronic consumer apparatus such as television receivers and video recorders. In such situations the time-averaged efficiency of the power supply apparatus in accordance with the invention will be very much higher than that of known power supply apparatus.

These and other aspects of the invention will be apparent from and elucidated with reference to the embodiments described hereinafter.

BRIEF DESCRIPTION OF THE DRAWINGS

In the drawings:

FIGS. 1A and 1B show a circuit diagram and an equivalent diagram, respectively, of a known power supply apparatus, and FIGS. 2A and 2B show a circuit diagram and an equivalent diagram, respectively, of an embodiment of a power supply apparatus in accordance with the invention.

DETAILED DESCRIPTION OF THE PREFERRED EMBODIMENT

The power supply apparatus shown in the form of a circuit diagram in FIG. 1A comprises a positive input terminal 1 and a negative input terminal 3 whereto an electric direct voltage can be applied, which voltage originates, for example from a battery or a mains rectifier (not shown). An input capacitor 5 is arranged between the input terminals 1, 3 and serves to smooth a ripple voltage, if any. The input terminals 1, 3 are also interconnected via a first series connection 7 which in this case consists of a first coil 9 and a controllable switching element 11. The first coil 9 constitutes the primary coil of a transformer 13 which also comprises a secondary coil 15. The controllable switching element 11 is in this case formed by a bipolar transistor of the NPN type. Evidently, other known switching elements, for example PNP transistors or MOSFETs, can also be used. A control circuit 17 serves for the periodic supply of switching pulses to a control electrode of the switching element 11 in order to adjust said element alternately to an electrically conductive and an electrically non-conductive state. The secondary coil 15 of the transformer 13 is connected in series with a diode 19 and an output capacitor 21. The output capacitor 21 is connected to a positive output terminal 23 and to a negative output terminal 25 whereto a load 27 (denoted by dashed lines) can be connected.

The power supply apparatus also comprises a peak-limiting circuit 29 for limiting the maximum voltage across the switching element 11. The circuit 29 comprises a capacitor 31 and a second series connection of a first rectifier element 33 (for example, a diode) and a resistor 35. One end of the resistor 35 and the capacitor 31 is connected to the positive input terminal 1 whereas the other end is connected to the cathode of the first rectifier element 33. The anode of the first rectifier element 33 is connected to the junction 37 of the coil 9 and the switching element 11.

The operation of the power supply apparatus shown in FIG. 1A will be described in detail hereinafter on the basis of the equivalent diagram shown in FIG. 1B. Whenever possible the reference numerals used in the equivalent diagram correspond to those used in FIG. 1A. The transformer 13 is shown as a combination of the primary coil 9 and a leakage inductance 39. The following symbols will be used hereinafter:

$V_i$ the input voltage $V_o$ the output voltage, transformed to the primary side of the transformer 13, $V_s$ the voltage across the leakage inductance 39, $V_{s,max}$ the maximum value of $V_s$ (occurring if the load 27 is maximum), $V_{37}$ the voltage at the junction 37 (being the voltage across the switching element 11)

$V_C$ the voltage across the capacitor 31, $I_p$ the current through the first coil 9, T the period duration of a switching cycle (the period of the switching pulses supplied by the control circuit 17), $\delta T$ the period of time during which the switching element 11 is closed (on-time), $\delta T_{max}$ the maximum on-time (occurring if the load 27 is maximum), $\delta$ the duty cycle, being the ratio of the on-time to the overall period duration, so $\delta T/T$, $\delta_{max}$ the maximum duty cycle (occurring if the load 27 is maximum), $R_1$ the value of the resistor 35, $I_1$ the mean discharge current of the capacitor 31, $Q_1$ the charge across the capacitor 31.

The voltage drop occurring across the rectifier element 33 and the diode 19 when they are in the conductive state will be ignored hereinafter. Assume that the switching element 11 is closed (on) and is opened (switched off) at an instant $t_0$. Immediately after switching off, the voltage across the switching element then equals:

$$V_{37}(t_0) = V_s(t_0) + V_o + V_i \quad (1)$$

This voltage is dependent inter alia on $V_s(t_0)$ which is larger as the load 27 is larger. This is because as the load is larger, the peak current $I_p$ also becomes larger. This current also passes the leakage inductance 39, so that the energy in the leakage inductance is greater. This energy is drained to the capacitor 31 and results in a higher voltage $V_s$. If $\delta T = \delta T_{max}$, $V_s(t_0)$ also has its maximum value $V_{s,max}$. The current $I_p$ then in first instance charges the capacitor 31 to:

$$C_c = V_{37} - V_i = V_s(t_0) + V_o \quad (2)$$

$I_p$ is gradually taken over by the chain with the leakage inductance 39, the diode 19, the output capacitor 21 and the load 27. At an instant $t_1$ this take-over has been completed, so that $V_s = 0$, and hence:

$$V_{37}(t_1) = V_o + V_i \quad (3)$$

The first rectifier element 33 is blocked as soon as $V_{37}$ becomes smaller than the value given in (1), so immediately after $t_0$. As from that instant the capacitor 31 is discharged (partly) via the resistor 35. The mean discharge current of the capacitor 31 equals:

$$I_1 = V_C/R_1 \quad (4)$$

For this discharge the entire period duration T is available and the amount of electric charge then displaced thus equals:

$$Q_1 = I_1 T \quad (5)$$

Therefore, for the entire period duration T a voltage is present across the resistor 35, so that energy is dissipated in this resistor for the entire period duration.

The power supply apparatus in accordance with the invention which is shown in the form of a circuit diagram in FIG. 2A comprises essentially the same components as the power supply apparatus shown in FIG. 1A. The same reference numerals are used for corresponding components. The peak-limiting circuit 29 comprises a first rectifier element 33 and a capacitor 31 which may be identical to the corresponding elements of the peak-limiting circuit shown in FIG. 1A. The resistor 35 of FIG. 1A has been replaced by a resistor 135 which, as will be explained in detail hereinafter, has a value other than that of the resistor 35. The resistor 135 and the first rectifier element 33 constitute a second series connection as in FIG. 1A. The peak-limiting circuit 29 also comprises a second rectifier element 41 (for example, a diode) whose cathode is connected to the positive input terminal 1. The anode of the second rectifier element 41 is connected to a first end of the first series connection whose second end is connected to the negative input terminal 3. In the embodiment shown the first end of the second series connection is the end of the resistor 135 which is remote from the first rectifier element 33 and the second end is the anode of the first rectifier element. The positions of the first rectifier element 33 and the resistor 135 can also be interchanged. In the part of the peak-limiting circuit 29 formed by the first and the second rectifier element 33, 41 and the resistor 135, the forward directions of the rectifier elements are the same. The capacitor 31 is connected between the anode of the second rectifier element 41 and the junction 37 of the coil 9 and the switching element 11.

FIG. 2B shows an equivalent diagram of the circuit shown in FIG. 2A, the set-up of FIG. 2B being the same as that of FIG. 1B. In addition to the symbols used for the description of FIG. 1, the following symbols will also be used for the description of FIG. 2:

$R_2$ the value of the resistor 135, $I_2$ the mean discharge current of the capacitor 31, $Q_2$ the charge across the capacitor 31.

It is assumed that the voltage drop across the second rectifier element 41 is also negligibly small when this rectifier element is in the conductive state. It can be readily understood that the variation of the currents and voltages up to and including the instant $t_1$ is the same as in the circuit shown in FIG. 1. The voltage values given in the formulas (1) to (3), therefore, also hold for FIG. 2. As from that instant, however, the procedure deviates from that shown in FIG. 1. As soon as $V_{37}$ becomes smaller than the value given in (1), i.e. immediately after $t_0$, the second rectifier element 41 is blocked. Because the switching element 11 is in the open state, the capacitor 31 cannot be discharged. It may be that the capacitor 31 is discharged to some extent if $V_0 + V_s > V_i$. The negative connection of the capacitor 31 may then carry a negative voltage for the idle time. The amount of charge, however, is then minimum. Substantial discharging of the capacitor 31 becomes possible only after the switching element 11 has become electrically conductive. $V_{37}$ then quickly decreases to zero and the capacitor 31 is subsequently discharged during the on-time $\delta T$, via the first rectifier element 33 and the resistor 135. The mean discharge current $I_2$ of the capacitor 31 then equals:

$$I_2 = \delta \cdot V_C/R_2 \quad (6)$$

Therein, $V_C$ has the value in conformity with (2). For this discharge only the on-time $\delta T$ is available, so that voltage is present across the resistor $R_2$ only for this period of time. The amount of electric charge then displaced equals:

$$Q_2 = I_2 \delta T \quad (7)$$

In the worst case $\delta T = \delta T_{max}$, so:

$$Q_2 = I_2 \delta T_{max} \quad (7')$$

As has already been stated, the charging process described by the equations (1) and (2) is the same in both circuits. As a result, $Q_1$ also equals $Q_2$ for the same duty cycle $\delta$. By suitably choosing the value of the resistor 135 it can be ensured that the maximum voltage across the switching element 11 in the power supply apparatus shown in FIG. 2A is the same in the worst case (with the maximum duty cycle) as in the power supply circuit shown in FIG. 1A. It then follows from (4), (5), (6) and (7') that:

$$R_2 = \delta_{max} R_1 \quad (8)$$

The power dissipated per switching cycle in the resistor 35 or 135 equals the square of the voltage across the capacitor 31, divided by the value of the resistor and multiplied by the part of the switching period in which the dissipation takes place. For the known circuit the dissipated power will be indicated as $P_1$ (dissipation during the entire period duration T) and for the circuit in accordance with the invention as $P_2$ (dissipation during $\delta T$). In that case:

$$P_1 = \frac{(V_o + V_s)^2}{R_1} \quad (10)$$

$$P_2 = \frac{(V_o + V_s)^2}{R_2} \cdot \delta = \frac{(V_o + V_s)^2}{R_1} \cdot \frac{\delta}{\delta_{max}} \quad (11)$$

Consequently, in the power supply apparatus in accordance with the invention the dissipated power has been reduced by a factor $\delta/\delta_{max}$ with respect to the power dissipated in the known power supply apparatus. The gain in respect of dissipation is greater as $\delta$ is smaller, i.e. as the power $P_o$ applied to the load 27 is smaller. The gain is, therefore, particularly large in power supply apparatus which for a substantial part of the time must deliver a power amounting to only a small fraction of the maximum power that can be delivered. This situation occurs, for example in power supply apparatus for television receivers and video recorders which remain in the so-called stand-by mode for a substantial part of the day; however, the gain is also important for other power supply apparatus with widely varying loads. It is to be noted that it has been found in practice that the gain is slightly less than said factor $\delta/\delta_{max}$ because in the power supply apparatus in accordance with the invention $V_s$ appears to be slightly larger than in the known power supply apparatus if $\delta < \delta_{max}$.

I claim:

1. A power supply apparatus for converting an electric direct voltage, acting as an input voltage, into an output voltage, comprising positive and negative input terminals which are arranged to receive the input voltage, a first series connection which consists of at least one coil and a controllable switching element and interconnects the input terminals, and a peak-limiting circuit for limiting the maximum voltage across the switching element, said peak-limiting circuit comprising at least a capacitor and a second series connection which consists of a first rectifier element and a resistor and is connected to the positive input terminal as well as to the junction of the coil and the switching element, characterized in that the peak-limiting circuit also comprises a second rectifier element which connects one end of the second series connection to the positive input terminal, the forward directions of the rectifier elements in the part of the peak-limiting circuit formed by the first and the second rectifier elements and the resistor being the same, the other end of the second series connection being connected to the negative input terminal, and the capacitor being connected between the anode of the second rectifier element and the junction of the coil and the switching element.

* * * * *